(12) United States Patent
Hayakawa

(10) Patent No.: US 6,291,000 B1
(45) Date of Patent: Sep. 18, 2001

(54) METHOD OF CONCENTRATING TOMATO JUICE BY REVERSE OSMOSIS

(75) Inventor: Kiro Hayakawa, Tochigi (JP)

(73) Assignee: Kagome Kabushiki Kaisha (JP)

( * ) Notice: Subject to any disclaimer, the term of this patent is extended or adjusted under 35 U.S.C. 154(b) by 0 days.

(21) Appl. No.: 09/594,289

(22) Filed: Jun. 15, 2000

(30) Foreign Application Priority Data

Sep. 13, 1999 (JP) .................................................. 11-258377

(51) Int. Cl.$^7$ ....................................................... A23L 1/212

(52) U.S. Cl. ........................ 426/422; 426/490; 426/492; 426/599

(58) Field of Search .................................. 426/422, 599, 426/490, 492

(56) References Cited

FOREIGN PATENT DOCUMENTS 05-015351 * 1/1993 (JP) .
08-280364 * 10/1996 (JP) .

* cited by examiner

Primary Examiner—Anthony Weier
(74) Attorney, Agent, or Firm—Coudert Brothers

(57) ABSTRACT

Tomato juice is concentrated by reverse osmosis to over 20% in Brix scale by causing low-concentration tomato juice to flow down under a high-pressure condition in a straight flow to a one-stage unit having a plurality of tubular membrane modules connected in series. In order not to overload the apparatus and highly concentrated tomato juice can be obtained reliably, the flow is controlled such that the pressure loss inside the unit is 30 kg/cm$^2$ or less, linear speed of the tomato juice at the inlet of the unit and the total membrane length of the tubular membrane modules satisfy a certain specified condition and the tubular membrane modules have salt rejecting rate of 90% or over.

2 Claims, 1 Drawing Sheet

METHOD OF CONCENTRATING TOMATO JUICE BY REVERSE OSMOSIS

BACKGROUND OF THE INVENTION

This invention relates to a method of concentrating tomato juice by reverse osmosis.

The method based on reverse osmosis is coming to be considered for concentrating tomato juice because concentrated tomato juice of a higher quality can be obtained by this method than by a more commonly practiced method by heating and evaporation. At the site of such a concentration work, it goes without saying that it is desirable to be able to produce highly concentrated tomato juice reliably and stably without overloading the apparatus for concentration by reverse osmosis, at a low production cost and under a simple process management. The object of this invention is to respond to such requirements.

Conventionally known methods of concentrating tomato juice by reverse osmosis include the single-stage single-pass methods, the multi-stage single-pass methods and the multi-stage circulation methods. By the multi-stage methods, units for concentration each having a plurality of tubular membrane modules are aligned in series in two or more stages and tomato juice is caused either to flow through such units in a straight flow or to circulate around therethrough. Fairly highly concentrated products are obtainable by such a multi-stage method but the disadvantage of this method is that the apparatus for the concentration is expensive and this adversely affects the cost of production. Moreover, while the process management is cumbersome, bacterial contamination at connections of the units and quality degradation are difficult to avoid. Thus, these methods have been considered impractical and the single-stage single-pass methods are more commonly practiced by which a concentration unit with a plurality of serially connected tubular membrane modules is provided only in one stage and tomato juice is caused to flow therethrough only once.

On the subject of concentrating tomato juice by reverse osmosis in a single-stage single-pass process, Japanese Patent Publication Tokko 61-48904 disclosed a method for controlling tomato juice in a laminar flow area with Reynold's number less than 3000, its linear speed at 80 cm/second or less at the entrance to the concentration unit and the pressure loss at less than 35 kg/cm$^2$. Japanese Patent Publication Tokko 59-53824 disclosed another method of controlling the sludge volume of tomato juice at 5% or more and the pressure loss at less than 40 kg/cm$^2$. By either of these methods, however, the apparatus for concentration by reverse osmosis tends to become overloaded occasionally and the problem remains that highly concentrated products cannot be obtained reliably and stably.

SUMMARY OF THE INVENTION

It is therefore an object of this invention to provide a method of reliably and stably produce highly concentrated tomato juice by reverse osmosis in a single-stage straight-flow process.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings.

DETAILED DESCRIPTION OF THE INVENTION

Figure 1:
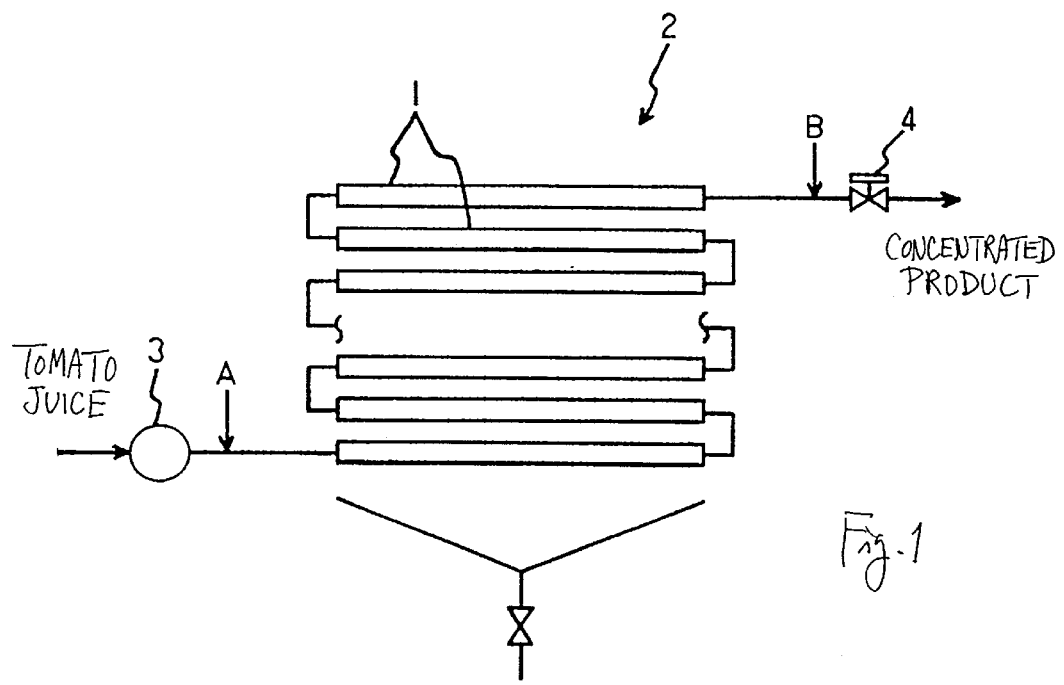
FIG. 1 is a schematic diagram of an apparatus for concentrating tomato juice by reverse osmosis by a method embodying this invention.

The invention relates to a method of concentrating tomato juice characterized not only wherein the tomato juice is caused to flow down in a straight-flow (that is, not in a circulatory motion) under a high-pressure condition to a single-stage concentration unit with a plurality of tubular membrane modules connected in series for reverse osmosis but also wherein the flow is effected with pressure loss equal to or less than 30 kg/cm$^2$ and under a condition that the linear speed (=X in units of cm/sec) of the tomato juice entering the concentration unit and the total length (=Y in units of meters) of the membranes of the tubular membrane modules forming the concentration unit satisfy the relationship given below:

$$1.8182X+70 \leq Y \leq -1.0182X+264.4 \qquad \text{Formula(1)}$$

wherein the efficiency of rejecting salt by the tubular membrane modules ("salt rejecting rate") is 90% or greater and wherein concentration is effected to over by Brix scale by reverse osmosis.

Because the method according to this invention is by a single-stage single-pass process, it is possible to avoid an increase in the production cost caused mainly by the high cost of apparatus, as well as the cumbersome process management, which are inevitable consequences of methods based on multi-stage single-pass or multi-stage circulating flow processes.

The method according to this invention is also characterized in that a highly concentrated product with concentration 20% or greater in Brix scale is produced. It goes without saying that it is desirable to make the concentration in Brix scale of the obtained product as high as possible but the optimum concentration in Brix scale of the concentrated product is found to be about 20% if it is to be avoided to unreasonably overload the apparatus for concentration by reverse osmosis while satisfying the requirements regarding storage and transportation of the concentrated product.

Another characteristic is that the concentration by reverse osmosis is effected with pressure loss of 30 kg/cm$^2$ or less. As a practical matter, the pressure resistance of the tubular membrane modules of the concentration unit is about 60–70 kg/cm$^2$ but since the osmotic pressure of tomato juice with concentration of 20% in Brix scale is about 30 kg/cm$^2$, the maximum pressure loss for obtaining concentrated tomato juice with concentration of 20% or greater without unreasonably overloading the apparatus becomes about 30–40 kg/cm$^2$. On the other hand, if the supply pressure (or the pressure at the inlet to the condensation unit) of the tomato juice is increased over 60 kg/cm$^2$, the effect of concentration polarization (or the phenomenon of the solute concentration becoming higher near the inner surfaces of the hollow tubular semipermeable membranes comprising the tubular membrane modules) becomes too large. Even if the supply pressure is increased still further, the amount of the liquid which penetrates through these hollow tubular semipermeable membranes ceases to increase appreciably. This means that concentration by reverse osmosis be preferably carried out at a pressure loss of less than 30 kg/cm$^2$ in order to reliably produce tomato juice with concentration of 20% or over in Brix scale without unreasonably overloading the apparatus for reverse osmosis.

The invention also teaches the use of hollow tubular membrane modules with salt rejecting rate 90% or greater for the tubular membrane modules comprising the concentration unit of the apparatus for reverse osmosis. If the salt rejecting rate of the material is less than 90%, there is an excessive permeation of the solute, and a concentrated product with the natural quality of tomato juice cannot be obtained. For this reason, it is even more preferable to use tubular membrane modules with salt rejecting rate of over 99%.

The invention additionally teaches that the concentration process by reverse osmosis be carried out such that the linear speed (X in units of cm/sec) of the tomato juice at the inlet of the concentration unit and the total membrane length (Y in units of m) of the tubular membrane modules comprising the condensation unit satisfy the relationship given by Formula (1) given above. A high-quality highly concentrated tomato juice of 20% or over in Brix scale can be obtained reliably according to this invention without overloading an apparatus of a practical kind for concentration by reverse osmosis only if tomato juice is caused to flow down in a single-stage single-pass process with pressure loss of 30 kg/cm² or less to a concentration unit formed by connecting tubular membrane modules with salt rejecting rate 90% or over under a condition satisfying Formula (1).

FIG. 1 shows schematically the structure of a concentration apparatus by reverse osmosis by a single-stage single-pass process. A concentration unit 2 in only one stage formed by connecting a plurality of tubular membrane modules 1 in series is provided. A high-pressure pump 3 is provided on the inlet side of the concentration unit 2 and a pressure control valve 4 is provided on its outlet side. With an apparatus thus structured, tomato juice is supplied through the high-pressure pump 3 into the concentration unit 2 and is caused to flow down therethrough in a single-stage single-pass process while the permeated liquid which has passed through the hollow tubular semipermeable membranes of the plurality of tubular membrane modules forming the concentration unit 2 is collected and the correspondingly concentrated product is obtained through the pressure control valve 4. In such a process, the inlet pressure into the concentration unit 2 measured at the position indicated by letter A in FIG. 1, the outlet pressure from the concentration unit 2 measured at the position indicated by letter B in FIG. 1, and hence the pressure loss in the concentration unit 2 obtained as the difference therebetween, and the linear speed X of the tomato juice at the inlet into the concentration unit 2 can be adjusted by controlling the opening of the pressure control valve 4 and the number of rotations of the high-pressure pump 3. The total membrane length Y of the tubular membrane modules 1 can be adjusted by controlling the length per each of the tubular membrane modules comprising the concentration unit 2 as well as the number of the modules that are connected.

Figure 2:
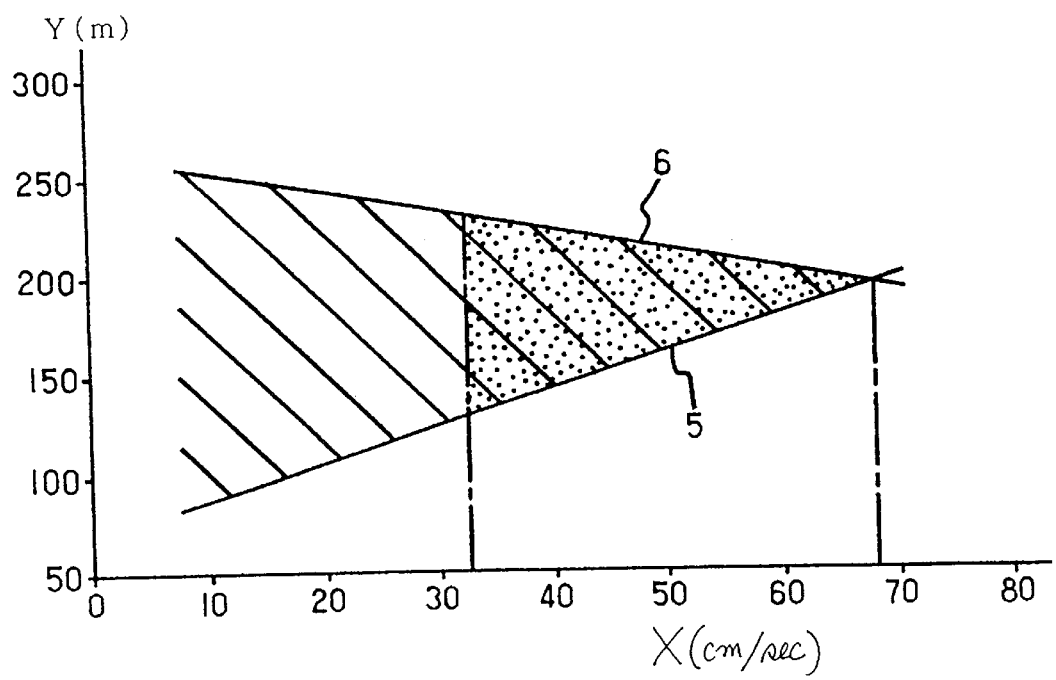
FIG. 2 is a graph showing the relationship between the linear speed X at the entrance to the concentration unit and the total length of membrane Y forming the concentration unit according to this invention when tomato juice is concentrated by a method embodying this invention.

FIG. 2 is a graph for showing the relationship between linear speed X of the tomato juice at the inlet of the concentration unit and the total membrane length Y of the tubular membrane modules comprising the concentration unit when tomato juice at concentration 5% (at 20° C.) in Brix scale is caused to flow down in a single-stage single-pass process to the concentration unit comprising tubular membrane modules with salt rejecting rate 99%. As will be explained in detail below, numeral 5 indicates a straight line given by Y=1.8182X+70 and numeral 6 indicates a straight line given by Y=−1.0182X+264.4 such that the shaded portion bounded by these two lines 5 and 6 represents the area satisfying Formula (1) wherein highly concentrated tomato juice 20% (at 20° C.) or over in Brix scale can be obtained reliably at a pressure loss of 30 kg/cm² or less.

FIG. 2 shows that the upper limit of X for the shaded area is 68.5 but there is no lower limit. In other words, the linear speed of tomato juice at the inlet to the concentration unit may be reduced to nearly zero, but this is not practical. If X is reduced to less than 33, the flow may start to pulsate in the high-pressure pump for supplying the tomato juice to the concentration unit. It is therefore preferred that X be greater than 33. The dotted portion of the shaded area in FIG. 2 indicates this preferred area.

The invention is described next by way of the following four embodiments.

Embodiment (1)

Method of obtaining tomato juice with concentration 22.0% in Brix scale (at 20° C.) by reverse osmosis by causing tomato juice with concentration 5% in Brix scale (at 20° C.) to flow down in a single-pass process to a single-stage concentration unit having a plurality of tubular membrane modules with salt rejecting rate 99% connected in series such that the total membrane length Y is 175.0 m, the pressure at the inlet is 60 kg/cm², the pressure at the outlet is 44.0 kg/cm² (that is, the pressure loss is 16.0 kg/cm²) and the linear speed at the inlet X is 33 cm/sec.

Embodiment (2)

Method of obtaining tomato juice with concentration 22.5% in Brix scale (at 20° C.) by reverse osmosis by causing tomato juice with concentration 5% in Brix scale (at 20°C.) to flow down in a single-pass process to a single-stage concentration unit having a plurality of tubular membrane modules with salt rejecting rate 99% connected in series such that the total membrane length Y is 180.0 m, the pressure at the inlet is 60 kg/cm², the pressure at the outlet is 43.0 kg/cm² (that is, the pressure loss is 17.0 kg/cm²) and the linear speed at the inlet X is 44 cm/sec.

Embodiment (3)

Method of obtaining tomato juice with concentration 21.5% in Brix scale (at 20° C.) by reverse osmosis by causing tomato juice with concentration 5% in Brix scale (at 20° C.) to flow down in a single-pass process to a single-stage concentration unit having a plurality of tubular membrane modules with salt rejecting rate 99% connected in series such that the total membrane length Y is 190.0m, the pressure at the inlet is 60 kg/cm², the pressure at the outlet is 42.0 kg/cm² (that is, the pressure loss is 18.0 kg/cm²) and the linear speed at the inlet X is 55 cm/sec.

Embodiment (4)

Method of obtaining tomato juice with concentration 20.7% in Brix scale (at 20° C.) by reverse osmosis by causing tomato juice with concentration 5% in Brix scale (at 20° C.) to flow down in a single-pass process to a single-stage concentration unit having a plurality of tubular membrane modules with salt rejecting rate 99% connected in series such that the total membrane length Y is 195.0m, the pressure at the inlet is 60 kg/cm², the pressure at the outlet is 40.7 kg/cm² (that is, the pressure loss is 19.3 kg/cm²) and the linear speed at the inlet X is 66 cm/sec.

The invention is described next by way of test examples and comparison examples, but it goes without saying that the invention is not limited to these test examples.

As Test Example 1, tomato juice with concentration 20.5% in Brix scale (at 20° C.) was obtained by reverse osmosis by causing tomato juice with concentration 5% in Brix scale (at 20° C.) to flow down in a single-pass process to a single-stage concentration unit having a plurality of tubular membrane modules with salt rejecting rate 99% connected in series such that the total membrane length Y was 130.0m, the pressure at the inlet Pi was 60 kg/cm², the pressure at the outlet Po was 47.6 kg/cm² (that is, the pressure loss ΔP was 12.4 kg/cm²) and the linear speed at the inlet X was 33cm/sec.

Test Examples 2–12 and Comparison Examples 1–8 were obtained similarly but under different conditions as shown in Tables 1 and 2. Their concentrations in Brix scale (Brix) are also shown.

In Tables 1 and 2, the relationship indicated by straight line 5 of FIG. 2 is obtained from Test Examples 1–4, the relationship indicated by straight line 6 of FIG. 2 is obtained from Test Examples 5–8, and Test Examples 9–12 are in the dotted area between straight lines 5 and 6 of FIG. 2. Comparison Examples 1–4 are below the lower straight line 5 of FIG. 2, and Comparison Examples 5–8 are above the upper straight line 6 of FIG. 2.

Tables 1 and 2 clearly show that highly concentrated products of 20% or more in Brix scale can be reliably obtained by reverse osmosis in a single-stage single-pass process according to a method of this invention without unreasonably overloading a practically used apparatus.

What is claimed is:

1. A method of concentrating tomato juice, said method comprising the steps of:

causing tomato juice to flow down under a high-pressure condition in a straight flow to a one-stage unit having an inlet, an outlet and a plurality of tubular membrane modules connected in series; and concentrating said tomato juice by reverse osmosis to over 20% in Brix scale;

wherein pressure loss inside said unit is 30 kg/cm² or less, linear speed X in units of cm/second of said tomato juice at said inlet and total membrane length Y in units of meters of said tubular membrane modules satisfy Formula given by $1.8182X+70 \leq Y \leq -1.0182X+264.4$, said tubular membrane modules have salt rejecting rate of 90% or over, and X is greater than 33.

2. The method of claim 1 wherein the salt rejecting rate of said tubular membrane modules is greater than 99%.

TABLE 1

| Test Examples | X (cm/sec) | Y (m) | Pi (kg/cm²) | Po (kg/cm²) | ΔP (kg/cm²) | Brix (%) |
|---|---|---|---|---|---|---|
| 1 | 33 | 130.0 | 60.0 | 47.6 | 12.4 | 20.5 |
| 2 | 44 | 150.0 | 60.0 | 45.6 | 14.4 | 20.7 |
| 3 | 55 | 170.0 | 60.0 | 39.1 | 20.9 | 21.1 |
| 4 | 66 | 190.0 | 60.0 | 41.0 | 19.0 | 20.5 |
| 5 | 33 | 230.8 | 60.0 | 39.8 | 20.2 | 20.5 |
| 6 | 44 | 219.6 | 60.0 | 39.3 | 20.7 | 20.5 |
| 7 | 55 | 208.4 | 60.0 | 35.8 | 24.2 | 20.9 |
| 8 | 66 | 197.2 | 60.0 | 40.4 | 19.6 | 20.9 |
| 9 | 33 | 175.0 | 60.0 | 44.0 | 16.0 | 22.0 |
| 10 | 44 | 180.0 | 60.0 | 43.0 | 17.0 | 22.5 |
| 11 | 55 | 190.0 | 60.0 | 42.0 | 18.0 | 21.5 |
| 12 | 66 | 195.0 | 60.0 | 40.7 | 19.3 | 20.7 |

TABLE 2

| Comparison Examples | X (cm/sec) | Y (m) | Pi (kg/cm²) | Po (kg/cm²) | ΔP (kg/cm²) | Brix (%) |
|---|---|---|---|---|---|---|
| 1 | 33 | 100.0 | 60.0 | 52.0 | 8.0 | 18.0 |
| 2 | 44 | 130.0 | 60.0 | 49.0 | 11.0 | 18.2 |
| 3 | 55 | 150.0 | 60.0 | 45.0 | 15.0 | 18.5 |
| 4 | 66 | 170.0 | 60.0 | 43.0 | 17.0 | 19.0 |
| 5 | 33 | 250.0 | 60.0 | 39.8 | 20.2 | 18.0 |
| 6 | 44 | 240.0 | 60.0 | 36.0 | 24.0 | 18.5 |
| 7 | 55 | 230.0 | 60.0 | 35.0 | 25.0 | 18.0 |
| 8 | 66 | 210.0 | 60.0 | 33.0 | 27.0 | 17.5 |

* * * * *